(12) United States Patent
Yun et al.

(10) Patent No.: US 11,757,690 B2
(45) Date of Patent: *Sep. 12, 2023

(54) TRANSMITTER, RECEIVER AND CONTROLLING METHOD THEREOF

(71) Applicant: SAMSUNG ELECTRONICS CO., LTD., Suwon-si (KR)

(72) Inventors: Sung-ryul Yun, Suwon-si (KR); Young-ho Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,922

(22) Filed: Jun. 3, 2022

(65) Prior Publication Data

US 2022/0294675 A1    Sep. 15, 2022

Related U.S. Application Data

(63) Continuation of application No. 17/144,646, filed on Jan. 8, 2021, now Pat. No. 11,405,253, which is a (Continued)

(30) Foreign Application Priority Data

Jan. 13, 2014    (KR) .......................... 10-2014-0004024

(51) Int. Cl.
*H04K 1/02* (2006.01)
*H04L 27/26* (2006.01)
(Continued)

(52) U.S. Cl.
CPC .......... *H04L 27/262* (2013.01); *H04L 5/0048* (2013.01); *H04L 27/2602* (2013.01); (Continued)

(58) Field of Classification Search
CPC . H04L 27/262; H04L 5/0048; H04L 27/2602; H04L 27/2618; H04L 27/263; (Continued)

(56) References Cited

U.S. PATENT DOCUMENTS 7,782,810 B2    8/2010   Han et al.
8,121,017 B2    2/2012   Stadelmeier et al.
(Continued)

OTHER PUBLICATIONS

Written Opinion dated Nov. 24, 2014 by the Patent Cooperation Treaty in related application PCT/KR2014/007221.
(Continued)

*Primary Examiner* — Helene E Tayong
(74) *Attorney, Agent, or Firm* — Sughrue Mion, PLLC

(57) ABSTRACT

A transmitter includes: a frame generator configured to generate a frame including a frame starting symbol, at least one data symbol and a frame closing symbol; a pilot and reserved tone inserter configured to insert pilots and reserved tones in at least one of the frame starting symbol, the data symbol and the frame closing symbol such that positions of the reserved tones do not overlap positions of the pilots in the at least one of the frame starting symbol, the data symbol and the frame closing symbol; and a transmitter configured to transmit the frame in which the pilots and the reserved tones are inserted, wherein the reserved tones are not used to transmit data in the frame.

3 Claims, 13 Drawing Sheets

Related U.S. Application Data continuation of application No. 16/569,918, filed on Sep. 13, 2019, now Pat. No. 10,938,612, which is a continuation of application No. 16/025,757, filed on Jul. 2, 2018, now Pat. No. 10,454,736, which is a continuation of application No. 15/402,810, filed on Jan. 10, 2017, now Pat. No. 10,015,033, which is a continuation of application No. 14/450,480, filed on Aug. 4, 2014, now Pat. No. 9,559,821.

(60) Provisional application No. 61/923,804, filed on Jan. 6, 2014, provisional application No. 61/876,307, filed on Sep. 11, 2013, provisional application No. 61/862,158, filed on Aug. 5, 2013.

(51) Int. Cl.
  *H04L 5/00* (2006.01)
  *H04L 27/32* (2006.01)
  *H04L 25/02* (2006.01)

(52) U.S. Cl.
  CPC ........ *H04L 27/263* (2013.01); *H04L 27/2618* (2013.01); *H04L 27/32* (2013.01); *H04B 2201/70706* (2013.01); *H04L 25/0224* (2013.01)

(58) Field of Classification Search
  CPC ............... H04L 27/32; H04L 25/0224; H04B 2201/70706
  USPC ....................................................... 375/296
  See application file for complete search history.

(56) References Cited

U.S. PATENT DOCUMENTS

| | | |
|---|---|---|
| 8,300,714 B2 | 10/2012 | Yun et al. |
| 8,514,954 B1 | 8/2013 | Yu et al. |
| 2008/0298490 A1 | 12/2008 | Yun et al. |
| 2009/0103647 A1 | 4/2009 | Park et al. |
| 2009/0268604 A1 | 10/2009 | Yun et al. |
| 2010/0135316 A1 | 6/2010 | Atungsiri et al. |
| 2010/0166105 A1 | 7/2010 | Wu et al. |
| 2010/0195758 A1 | 8/2010 | Yun et al. |
| 2012/0224659 A1 | 9/2012 | Yu et al. |
| 2013/0243116 A1 | 9/2013 | Ko et al. |
| 2013/0279380 A1 | 10/2013 | Hong et al. |
| 2015/0207591 A1 | 7/2015 | Ko et al. |

OTHER PUBLICATIONS

Digital Video Broadcast (DVB); Frame structure channel coding and modulation for a second generation digital terrestrial television broadcasting system (DVB-T2); ETSI EN 302 755 V1.3.1; Apr. 2012; total pp. 188.
Digital Video Broadcasting (DVB),"Frame structure channel coding and modulation for a second generation digital terrestrial television broadcasting system (DVB-T2)", DVB Document A122, Jun. 2010.
International Search Report issued by Patent Cooperation Treaty, dated Nov. 24, 2014 in related application PCT/KR2014/007221.
Digital Video Broadcasting (DVD); Next Generation broadcasting system to Handheld, physical layer specification (DVB-NGH); DVD Document A160; Nov. 2012; total pp. 295.

FIG. 5

| Pilot pattern | DATA | | FSS,FCS | |
|---|---|---|---|---|
| | Dx | Dy | Dx | Dy |
| P4,4 | 4 | 4 | 4 | 1 |
| P8,2 | 8 | 2 | 8 | 1 |
| P16,2 | 16 | 2 | 16 | 1 |
| P16,4 | 16 | 4 | 16 | 1 |
| P32,2 | 32 | 2 | 32 | 1 |

TRANSMITTER, RECEIVER AND CONTROLLING METHOD THEREOF

CROSS-REFERENCE TO RELATED APPLICATIONS

This is a continuation of U.S. application Ser. No. 17/144,646 filed Jan. 8, 2021, is a continuation of U.S. application Ser. No. 16/569,918 filed Sep. 13, 2019, which is a continuation of U.S. application Ser. No. 16/025,757 filed Jul. 2, 2018, which is a continuation of U.S. application Ser. No. 15/402,810 filed Jan. 10, 2017, which is a continuation of U.S. application Ser. No. 14/450,480 filed Aug. 4, 2014, which claims priority from U.S. Provisional Application No. 61/862,158 filed on Aug. 5, 2013, U.S. Provisional Application No. 61/876,307 filed on Sep. 11, 2013, and U.S. Provisional Application No. 61/923,804 filed on Jan. 6, 2014 in the United States and Patent and Trademark Office, and Korean Patent Application No. 10-2014-0004024 filed on Jan. 13, 2014 in the Korean Intellectual Property Office, the disclosures of which are incorporated herein by reference in their entirety.

BACKGROUND

1. Field

Apparatuses and methods consistent with what is disclosed herein relate to a transmitter, a receiver, and a controlling method thereof, and more specifically, to a transmitter configured to use an orthogonal frequency division multiplexing (OFDM) method, a receiver and a controlling method thereof.

2. Description of the Related Art

Recent broadcasting communication services are developing to be multi-functional using a high-quality broadband. Specifically, according to the development of the electronic technology, mobile broadcasting devices such as high-definition digital TV and high-performance smart phone are widely distributed. Thus, requests for various broadcasting services are growing.

For one example to follow these requests, broadcasting communication standards such as Digital Video Broadcasting the Second Generation Terrestrial (DVB-T2) are developing. DVB-T2 is the second generation European ground wave digital broadcasting standard which advances performance of DVB-T. DVB-T is selected to be a broadcasting standard in more than 35 countries in the world including Europe. DVB-T2 implements increasing of a transmitting amount and higher bandwidth efficiency by applying the latest technologies such as Low Density Parity Check (LDPC) codes and 256-QAM modulating method. Thereby, it has an advantage that high-quality of various services such as high0definition television (HDTV) can be provided within a limited bandwidth.

However, an OFDM system used in DVB-T2 may have a problem in which a high peak to average power ratio (PAPR) is generated due to modulation of multi-carrier waves. Thus, because the OFDM method transmits data by using multi-carrier waves, a size of the amplitude of final OFDM signals may be a sum of amplitude value of each carrier wave. Thus, the final OFDM signal may have great changes in the amplitude, or may have an extremely great value when phases of carrier waves are uniform to one another. Such high PAPR signals may be out of a linear operating range of a high power amplifier. Further, there may be a problem in which a system performance deteriorates by generating distortion in signals passing through the high power amplifier.

Various methods are being suggested in order to address the above problem regarding the PAPR of the OFDM system. There are various PAPR reducing methods such as a clipping method, coding, selected mapping (SLM), a partial transmit sequence (PTS), and tone injection (TI).

In the TI method which is one of the above PAPR reducing methods, an L number of tones are reserved among an N number of sub-carriers, and the L number of the reserved tones are used to reduce the PAPR without transmitting data.

FIG. 1 illustrates frame constitution regarding the related broadcasting communication system. A plurality of OFDM symbols constitute one frame, and the structure of pilots shows scattered constitution in which positions of the pilots change per OFDM symbol. Because the pilots are used to estimate channels, there should be no interference and distortion. However, when the above reserved tones are used, a problem occurs, in which the reserved tones collide with the pilots in the frame constitution of FIG. 1.

FIG. 2 illustrates a case in which collision between the pilots and the reserved tone occurs according to the method using reserved tones among the related tone reserving methods in the frame constitution of FIG. 1. Thus, 201 does not show collision between the reserved tone and the pilots. However, 202, 203, 204 do show a collision between the pilots and the reserved tone.

Thus, it is necessary to insert the reserved tones while avoiding collision between the pilots and the reserved tones increases.

SUMMARY

Exemplary embodiments of the present inventive concept may overcome the above disadvantages and other disadvantages not described above. However, the present inventive concept is not required to overcome the disadvantages described above, and the exemplary embodiments of the present inventive concept may not overcome any of the problems described above.

One or more exemplary embodiments provide a transmitter configured to insert and transmit reserved tones in a frame such that positions of the reserved tones do not overlap positions of pilots in a frame starting symbol, at least one data symbol, and a frame closing symbol, a receiver, and a controlling method thereof.

According to an aspect of an exemplary embodiment, the transmitter may include: a frame generator configured to generate a frame including a frame starting symbol, at least one data symbol and a frame closing symbol; a pilot and reserved tone inserter configured to insert pilots and reserved tones in at least one of the frame starting symbol, the data symbol and the frame closing symbol such that positions of the reserved tones do not overlap positions of the pilots in the at least one of the frame starting symbol, the data symbol and the frame closing symbol; and a transmitter configured to transmit the frame in which the pilots and the reserved tones are inserted, wherein the reserved tones are not used to transmit data in the frame.

Here, the pilot and reserved tone inserter may insert the pilots in the data symbol according to a predetermined first arrangement pattern, insert the reserved tones in the data symbol such that the positions of the reserved tones do not overlap the positions of the pilots in the data symbol, insert the pilots in the frame starting symbol and the frame closing symbol according to a predetermined second arrangement pattern, and insert the reserved tones in the frame starting symbol and the frame closing symbol such that the positions of the reserved tones do not overlap the positions of the pilots in the frame starting symbol and the frame closing symbol.

The predetermined second arrangement pattern may be determined based on the predetermined first arrangement pattern.

The pilot and reserved tone inserter may insert a first reserved tone in a first data symbol among the at least one data symbol based on an arrangement pattern of the pilots inserted in the first data symbol, and insert a second reserved tone in a second data symbol immediately next to the first data symbol at a position shifted by a preset value from a position of the first reserved tone in the first data symbol.

The transmitter may further include: an inverse fast Fourier transform (IFFT) calculator configured to perform an IFFT calculating on the frame starting symbol, the data symbol and the frame closing symbol in which the pilots and the reserved tones are inserted and output results of the calculating; a parallel/series converter configured to convert parallel signals output from the IFFT calculator into series signals and output results of the converting; and a PAPR reduction performer configured to reduce a PAPR based on the pilots and the reserved tones.

The PAPR reduction performer may calculate reducing amounts of the PAPR based on the pilots and the reserved tones, adds the calculated reducing amounts to the series signals, and outputs results of the adding.

According to an aspect of another exemplary embodiment, the receiver may include: a receiver configured to receive a frame comprising a frame starting symbol, at least one data symbol, and a frame closing symbol, wherein pilots and reserved tones are inserted at least one of the frame starting symbol, the data symbol and the frame closing symbol; and a signal processor configured to estimate channels based on the pilots and extract data by processing the frame starting symbol, the data symbol and the frame closing symbol based on positions of the reserved tones, wherein the reserved tones are inserted such that position of the reserved tones do not overlap positions of the pilots, in the at least one of the frame starting symbol, the data symbol and the frame closing symbol, and wherein the reserved tones are not used to transmit the data in the frame.

According to an aspect of still another exemplary embodiment, the controlling method of the transmitter may include: generating a frame including a frame starting symbol, at least one data symbol, and a frame closing symbol; inserting pilots and reserved tones in at least one of the frame starting symbol, the data symbol and the frame closing symbol such that positions of the reserved tones do not overlap positions of the pilots in the at least one of the frame starting symbol, the data symbol and the frame closing symbol; and transmitting the frame in which the pilots and the reserved tones are inserted, wherein the reserved tones are not used to transmit data in the frame.

The inserting pilots and reserved tones may include: inserting the pilots in the data symbol according to a predetermined first arrangement pattern; inserting the reserved tones in the data symbol such that the positions of the reserved tones do not overlap the positions of the pilots in the data symbol; inserting the pilots in the frame starting symbol and the frame closing symbol according to a predetermined second arrangement pattern; and inserting the reserved tones in the frame starting symbol and the frame closing symbol such that the positions of the reserved tones do not overlap the positions of the pilots in the frame starting symbol and the frame closing symbol.

The predetermined second arrangement pattern may be determined based on the predetermined first arrangement pattern.

The inserting pilot tones and reserved tones may include: inserting a first reserved tone in a first data symbol among the at least one data symbol based on an arrangement pattern of the pilots inserted in the first data symbol; and inserting a second reserved tone in a second data symbol immediately next to the first data symbol at a position shifted by a preset value from a position of the first reserved tone in the first data symbol.

According to an aspect of still another exemplary embodiment, the controlling method of the receive may further include: performing an IFFT calculating on the frame starting symbol, the data symbol and the frame closing symbol in which the pilots and the reserved tones are inserted and outputting results of the calculating; converting parallel signals output by the performing the IFFT into series signals and outputting results of the converting; and reducing a PAPR based on the pilots and the reserved tones.

The reducing a PAPR may include calculating reducing amounts of the PAPR based on the pilots and the reserved tone, adding the calculated reducing amounts to the series signals, and outputting results of the adding.

According to an aspect of still another exe embodiment, the controlling method of the receiver includes: receiving a frame comprising a frame starting symbol, at least one data symbol, and a frame closing symbol, wherein pilots and reserved tones are inserted at least one of the frame starting symbol, the data symbol and the frame closing symbol; and estimating channels based on the pilots and extract data by processing the frame starting symbol, the data symbol and the frame closing symbol based on positions of the reserved tones, wherein the reserved tones are inserted such that position of the reserved tones do not overlap positions of the pilots, in the at least one of the frame starting symbol, the data symbol and the frame closing symbol, and wherein the reserved tones are not used to transmit the data in the frame.

According to the above various exemplary embodiments, the reserved tones can be inserted while avoiding collision between the pilots and the reserved tones, and the PAPR can be reduced based on the inserted pilots and reserved tones.

BRIEF DESCRIPTION OF THE DRAWINGS

The above and/or other aspects of the present inventive concept will be more apparent by describing certain exemplary embodiments with reference to the accompanying drawings, in which:

FIG. 5 illustrates positions of scattered pilots inserted into a frame starting symbol, a data symbol, and a frame closing symbol, according to an exemplary embodiment;

DETAILED DESCRIPTION OF THE EXEMPLARY EMBODIMENTS

Figure 1:
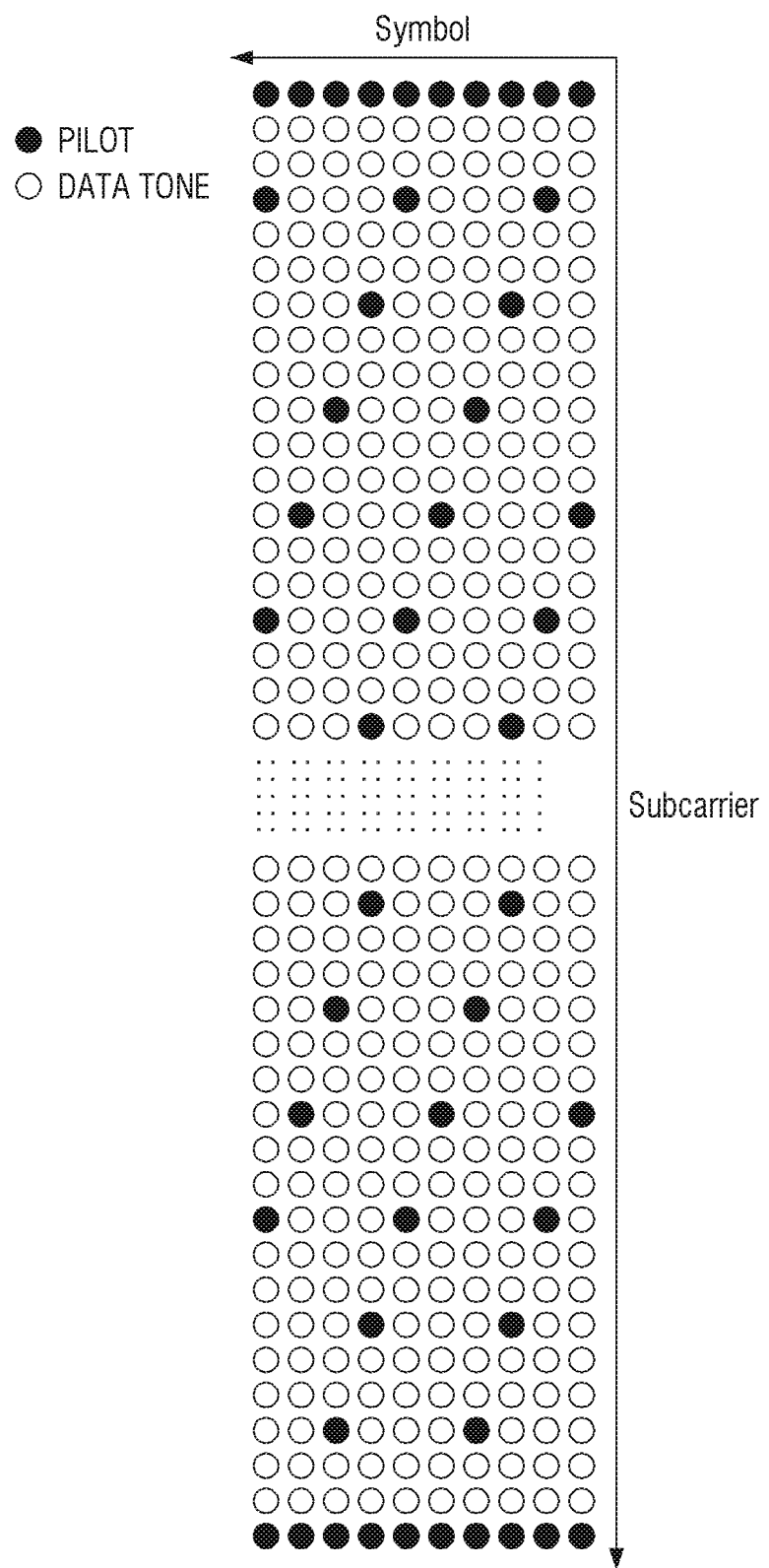
FIGS. 1 and 2 illustrate a related art frame.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

Figure 2:
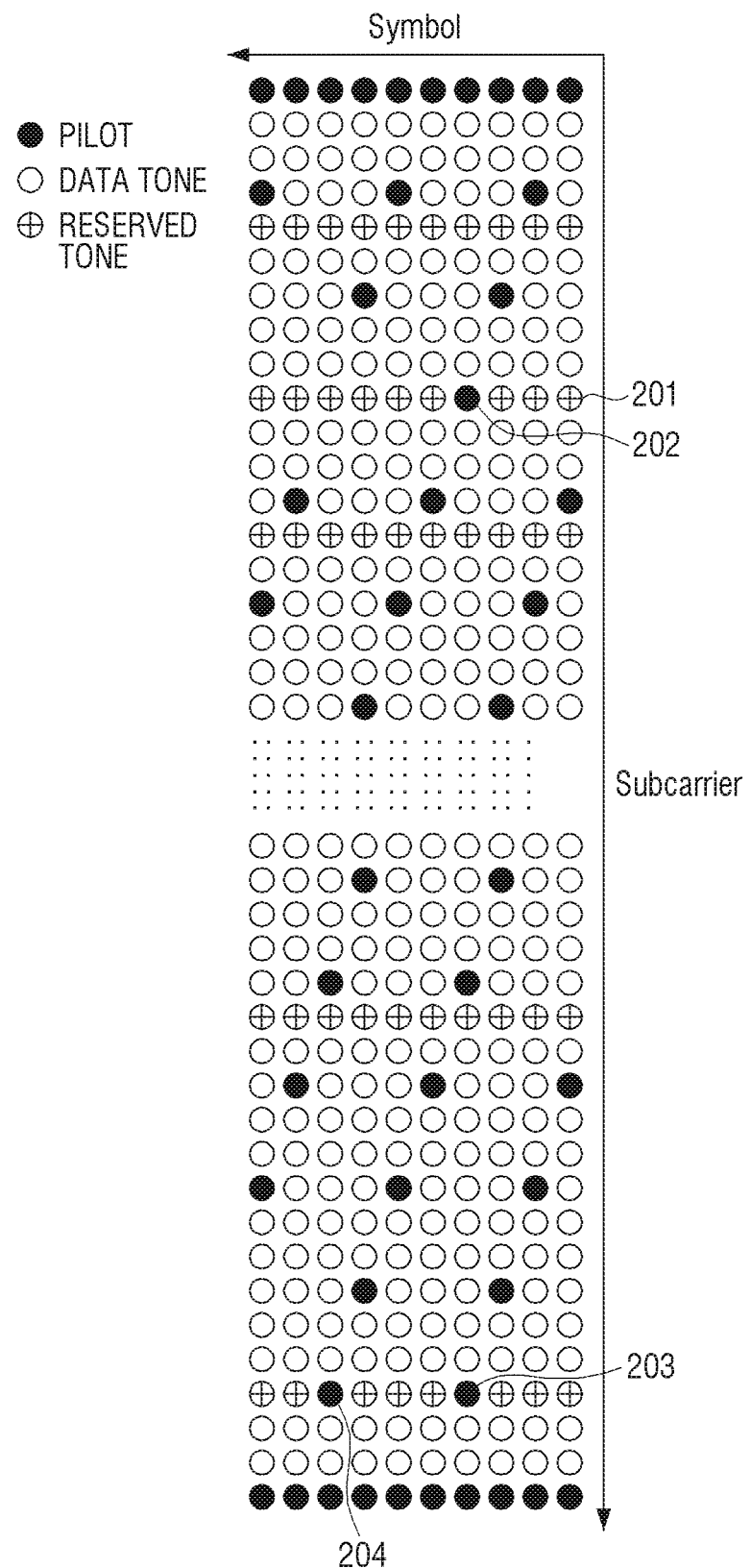

Referring to constitution, the pilots in FIG. 2 includes continual pilots that continue over a plurality of OFDM symbols and scattered pilots that are generated on one OFDM symbol and distributed on the frequency domain. Because positions of the pilots are different per OFDM symbol in this frame constitution, positions of reserved tones should be different for the frame constitute of FIG. 2. Thus, each OFDM symbol should include different reserved tones.

However, if each OFDM symbol includes different reserved tones, impulse wave shapes generated by the reserved tones provide different signals. Therefore, the OFDM system having the frame constitution of FIG. 2 should store information regarding every impulse wave shape in a memory, and a memory size increases.

According to an exemplary embodiment, there is provided a method in which one type of reserved tones is used for each frame without providing different types of reserved tones in each OFDM symbol. The frame constitution of the scattered pilots in FIG. 2 shows that the pilots move at a certain interval in each OFDM symbol. When the positions of the reserved tones are moved at the uniform or same interval with respect to those of the scattered pilots based on the above features, collision between the reserved tones and the scattered pilots can be avoided.

Figure 3:
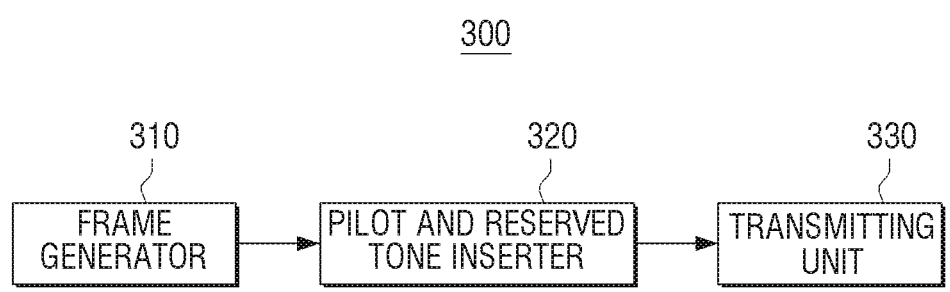
FIG. 3 is a block diagram of a transmitter according to an exemplary embodiment.

FIG. 3 is a block diagram of a transmitter according to an exemplary embodiment.

Referring to FIG. 3, the transmitter 300 includes a frame generator 310, a pilot and reserved tone inserter 320 and a transmitting unit 330.

The frame generator 310 may generate a frame which includes a frame starting symbol, a data symbol and a frame closing symbol.

The frame according to the present embodiment has a frame structure according to an Advanced Television System Committee (ATSC) 3.0 system. Specifically, the frame will be explained below by referring to FIG. 4.

Figure 4:
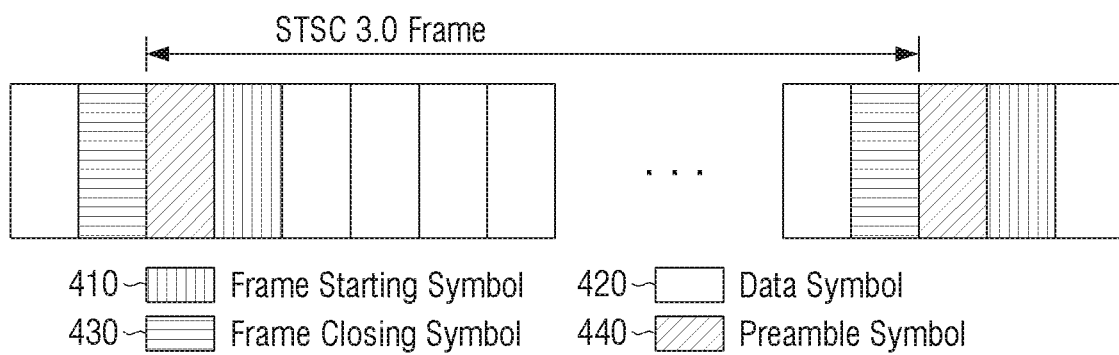
FIG. 4 illustrates frame constitution according to an exemplary embodiment.

FIG. 4 illustrates constitution of the frame according to the present embodiment.

Referring to FIG. 4, one frame 400 includes one preamble symbol 440, one frame starting symbol 410, a plurality of data symbols 420 and one frame closing symbol 430.

Herein, the frame 400 may correspond to a frame used in DVB-T2, which is a T2 frame. Thus, constitution of the T2 frame of DVB-T2 will be specifically described below in relation to the present embodiment.

One T2 frame includes a P1 preamble symbol informing a start position of the frame, a P2 preamble symbol transmitting L1 signals, and data symbols transmitting broadcasting signals.

Specifically, the P1 preamble symbol may be positioned at a front of the T2 frame and used to extract a start point of the T2 frame. Here, the P1 preamble symbol, which uses a 1K Fast Fourier Transform (FFT) size, is the signal in a guard interval format. Further, the P1 preamble symbol on the frequency domain may transmit seven (7) bits of information by using 384 sub-carriers among 853 sub-carriers of 1K FFT.

The preamble symbol 440 according to the present embodiment may correspond to the above described P1 preamble symbol and P2 preamble symbol, may be used to inform a start position of a frame for performing synchronization, and further may transmit L1 signals to be used for extracting data from broadcasting signals.

The frame starting symbol 410 informs a start point of the data symbol 420, and positions of pilots and reserved tones which are inserted into the frame starting symbol 410 and the data symbol 420 are different. It will be further described below.

The pilot and reserved tone inserter 320 may insert the pilots into the frame starting symbol, the data symbol, and the frame closing symbol, and insert the reserved tones so as not to overlap the positions of the pilots.

Herein, the pilot and reserved tone inserter 320 may correspond to a pilot inserter in a DVB-T2 transmitting system. The DVB-T2 transmitting system may include an input processor (not illustrated), a bit interleaved coding and modulation (BICM) encoder (not illustrated), a frame builder (not illustrated), and a modulator (not illustrated).

The above units will be briefly explained because they are uniformly defined in DVB-T2 which is one of digital broadcasting standards. Refer to "Digital Video Broadcasting (DVB); Frame structure channel coding and modulation for a second generation digital terrestrial television broadcasting system (DVB-T2)" for the detailed descriptions.

The input processor (not illustrated) may perform signal processing such that a baseband frame format of signals can be generated from input broadcasting signals.

The BICM encoder (not illustrated) performs coding by determining a forward error correction (FEC) coding rate and constellation order according to an area where data to be served will be transmitted (fixed PHY frame or mobile PHY frame). Signaling information regarding data to be served may be coded through another BICM encoder (not illustrated) or by sharing the data to be served with the above BICM encoder (not illustrated) according to implementation.

The frame builder (not illustrated) and the modulator (not illustrated) constitute a frame by determining OFDM parameters regarding a signaling area and OFDM parameters regarding the area where data to be served will be transmitted, and generate the frame by adding a sync area. Further, the frame builder (not illustrated) and the modulator (not illustrated) perform a modulation to modulate the generated frame into RF signals, and transmit the RF signals to a receiver.

Herein, a T2 frame structure may be constituted with data sub-carrier waves to transmit the modulated signals from broadcasting signals, pilots to estimate channels, and reserved tones to reduce a PAPR.

The pilots and the reserved tones may be processed in the pilot inserter (not illustrated) of the modulator (not illustrated). Specifically, the pilot inserter (not illustrated) inserts pilots in a predetermined pilot pattern on corresponding positions within the frame, and outputs to an OFDM generator (not illustrated). A plurality of cells within an OFDM frame are modulated into reference information regarding transmitting values informed to the receiver. Cells including the reference information are transmitted at a boosted power level. The information transmitted from the cells are a scattered pilot cell, a continual pilot cell, an edge pilot cell, a P2 pilot cell, or a frame closing pilot cell. Values of pilot information are obtained from a reference sequence which is a series of values.

Further, the pilot and reserved tone inserter 320 according to the present embodiment may correspond to the modulator (not illustrated) and the pilot inserter (not illustrated) used in DVB-T2.

Further, the transmitter 330 may transmit a frame inserted with the pilot and the reserved tone.

Meanwhile, the pilot and reserved tone inserter 320 inserts pilots for channel estimation and synchronization. The pilots may be divided into a P2 pilot only included in a P2 symbol and a frame closing pilot of the frame closing symbol as well as a scattered pilot and a continual pilot.

The scattered pilot is a pilot inserted in a predetermined pattern in the frequency axis direction as well as the time axis direction, and used mainly for channel estimation and equalization. Although the scattered pilot pattern of DVB-T is uniformly inserted regardless of an FFT size or protecting section, DVB-T2 flexibly applies eight (8) patterns from PP1 to PP8 according to FFT and protecting section. These patterns are established according to the length (1/Dx) of the maximum protecting section and limitation (1/Dy) of channel Doppler. Because sizes of the pilots per pattern are greater than normal data up to 2.5-7.4 dB, the patterns have an advantage in that overhead according to inserting the pilot can be reduced while maintaining sufficient performance of channel estimation.

Further, the continual pilot is inserted in a predetermined pattern in the time axis direction, and sizes of the inserted pilots are greater than normal data by 2.5-8.5 dB according to FFT while a number of the inserted pilots is smaller compared to DVB-T. Thus, it reduces overhead according to inserting the pilots at 8K, 16K, 32K modes from 2.5% to 0.7% without deteriorating in synchronizing frequencies with the continual pilots and performance of extracting CPE, and further reduces overhead by sharing positions of the scattered pilots with some continual pilots.

The continual pilots according to the present embodiment include pilots which are consecutively inserted in the frame starting symbol 410, the data symbol 420, and the frame closing symbol 430 while their positions are not modified therein, and the scattered pilots include pilots whose positions are modified and inserted according to a predetermined pattern in the frame starting symbol 410, the data symbol 420, and the frame closing symbol 430.

FIG. 5 illustrates positions of the scattered pilots which are inserted in a frame starting symbol (FSS) 410, the data symbol 420, and the frame closing symbol (FCS) 430, according to an exemplary embodiment.

For example, when a pilot pattern is P4, 4, the scattered pilots inserted in the data symbol 420 are determined to be arranged with a pattern of Dx=4 and Dy=4. This indicates that the scattered pilots inserted in the data symbol 420 are shifted by a uniform interval of four (4) and arranged in four (4) columns.

Further, the scattered pilots inserted in the frame starting symbol 410 and the frame closing symbol 430 are determined to be arranged with a pattern of Dx=4, Dy=1. This indicates that the scattered pilots inserted into the frame starting symbol 410 and the frame closing symbol 430 are shifted by a uniform interval of four (4) and arranged in one (1) column.

Thus, the arrangement pattern of the scattered pilots inserted in the data symbol 420 is different from the arrangement pattern of the scattered pilots inserted in the frame starting symbol 410 and the frame closing symbol 430.

Therefore, the arrangement pattern of reserved tones inserted in the data symbol 420 is different from the arrangement pattern of the reserved tones inserted in the frame starting symbol 410 and the frame closing symbol 430 to each other.

Further, the pilot and reserved tone inserter 320 may insert pilots in the data symbol 420 according to a predetermined first arrangement pattern, and insert reserved tones so as not to overlap the positions of the pilots in the data symbol 420. The pilot and reserved tone inserter 320 may also insert pilots into the frame starting symbol 410 and the frame closing symbol 430 according to a predetermined second arrangement pattern, and insert reserved tones so as not to overlap the positions of the pilots in the frame starting symbol 410 and the frame closing symbol 430.

Herein, the predetermined second arrangement pattern is determined based on the predetermined first arrangement pattern. Thus, the predetermined first arrangement pattern may indicate an arrangement pattern of the scattered pilots inserted in the data symbol 420, and the predetermined second arrangement pattern may indicate an arrangement pattern of the scattered pilots inserted in the frame starting symbol 410 and the frame closing symbol 430.

Further, the predetermined first arrangement pattern and the predetermined second arrangement pattern may be arrangement patterns including arrangement of the continual pilots as well as arrangement of the scattered pilots. The reserved tones inserted in the frame starting symbol 410, the data symbol 420, and the frame closing symbol 430 should not overlap the positions of the continual pilots and the scattered pilots.

Thus, according to the predetermined first arrangement pattern, the pilot and reserved tone inserter 320 may insert reserved tones in the data symbol 420 so as not to overlap the scattered pilots and the continual pilots inserted in the data symbol 420. Also, according to the predetermined second arrangement pattern, the pilot and reserved tone inserter 320 may insert reversed tones in the frame starting symbol 410 and the frame closing symbol 430 so as not to overlap the scattered pilots and the continual pilots inserted in the frame starting symbol 410 and the frame closing symbol 430.

If the first arrangement pattern and the second arrangement pattern only include the arrangement pattern of the scattered pilots, reserved tones may be inserted by further considering the arrangement pattern of the continual pilots. If the first arrangement pattern and the second arrangement pattern include the arrangement patterns of the scattered pilots and the continual pilots, reserved tones may be inserted by considering only the first and the second arrangement patterns.

Figure 6:
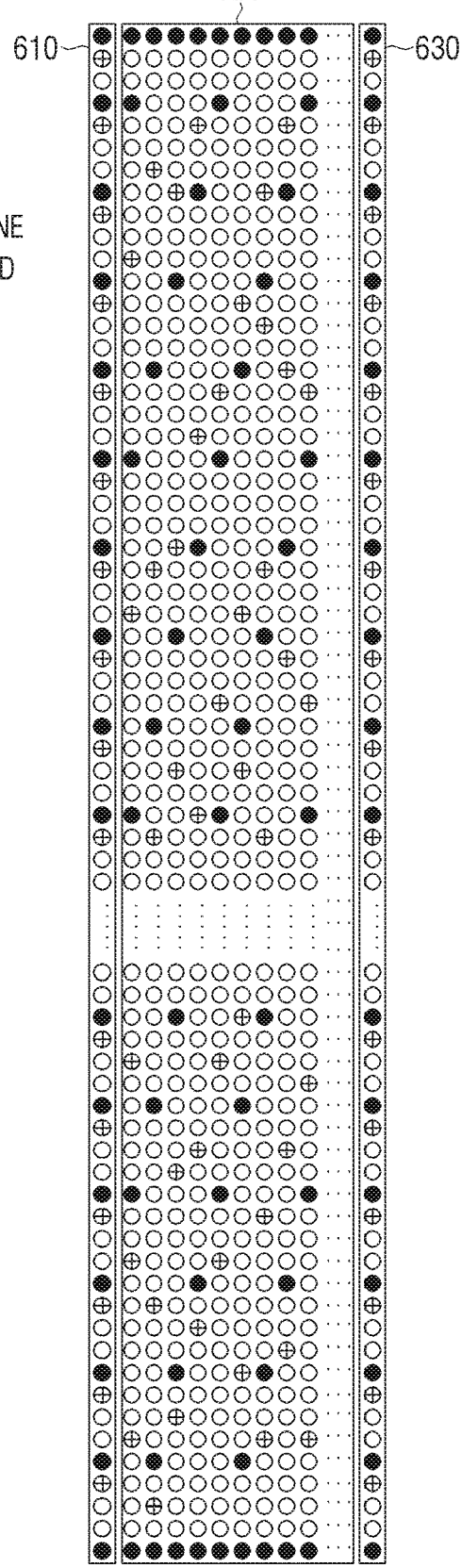
FIG. 6 illustrates frame constitution inserted such that scattered pilots do not collide with reserved tones, according to an exemplary embodiment.

FIG. 6 illustrates a frame constitution in which scattered pilots and reserved tones are inserted so as not to collide with each other.

As described above, collision between the scattered pilots and the reserved tones can be avoided and a problem in increasing the size of a memory when one reserved tone is reused can be addressed by determining the positions of the reserved tones in OFDM symbols to be the same as the shift intervals of the scattered pilots.

If the positions of the reserved tones circularly shift in the frequency domain, the wave shapes of an impulse generated by the reserved tones show changes only in phases while complex values do not change. Because such changes in phases become different by displaced intervals, if initial phase information is obtained, the phase changes may be confirmed according to the displaced intervals. Thus, the method inserting the reserved tones by considering the arrangement pattern of the pilots according to the present embodiment may be applied to every OFDM symbol within a frame.

Referring to FIG. 6, the arrangement patterns of pilots inserted in a frame starting symbol 610 and a frame closing symbol 630 are uniform or same, and the arrangement patterns of reserved tones inserted so as not to overlap the arrangement patterns of the pilots are uniform or same.

Meanwhile, the arrangement pattern of pilots inserted in a data symbol 620 is different from the arrangement patterns of pilots inserted in the frame starting symbol 610 and the frame closing symbol 630. The arrangement pattern of reserved tones inserted in the data symbol 620 so as not to overlap the arrangement pattern of the pilots in the data symbol 620 is different from the arrangement pattern of reserved tones inserted in the frame starting symbol 610 and the frame closing symbol 630.

Further, the pilots and the reserved tones inserted in all the symbols 610, 620, 630 described in FIG. 6 do not overlap with one another.

Meanwhile, the arrangement pattern of the pilots inserted in the frame starting symbol 610 and the frame closing symbol 630 may be determined based on the arrangement pattern of the pilots inserted in the data symbol 620.

For example, when an arrangement pattern of pilots inserted in the data symbol 620 is Dx=4, Dy=4, an arrangement pattern of pilots inserted in the frame starting symbol 610 and the frame closing symbol 630 becomes Dx=4, Dy=1. Thus, this (Dx=4, Dy=1) indicates that the pilots are arranged in one (1) column while the same shift interval of the inserted pilots maintained.

Thus, the pilots inserted in the frame starting symbol 610 and the frame closing symbol 630 are arranged on all positions of sub-carriers corresponding to the arrangement pattern of the pilots inserted in the data symbol 620.

Meanwhile, the pilot and reserved tone inserter 320 may insert a first reserved tone based on the arrangement pattern of the pilots inserted in the data symbol 620, and additionally insert a second reserved tone at a position shifted by a preset value from the position of the first reserved tone.

Specifically, as described above, the pilot and reserved tone inserter 320 may reserve the first reserved tone so as not to overlap the positions of the pilots inserted in the data symbol 620. Herein, the inserted pilots indicate all the scattered pilots and the continual pilots. Thus, the pilot and reserved tone inserter 320 may reserve the first reserved tone so as not to overlap positions of the scattered pilots and the continual pilots which are inserted in the data symbol 620.

Further, the pilot and reserved tone inserter 320 may reserve the second reserved tone by additionally considering the arrangement pattern of the scattered pilots. Specifically, the pilot and reserved tone inserter 320 may reserve the second reserved tone by considering the shift amount of the scattered pilots. This relationship between the pilots and the reserved tones will be described by referring to FIG. 7.

Figure 7:
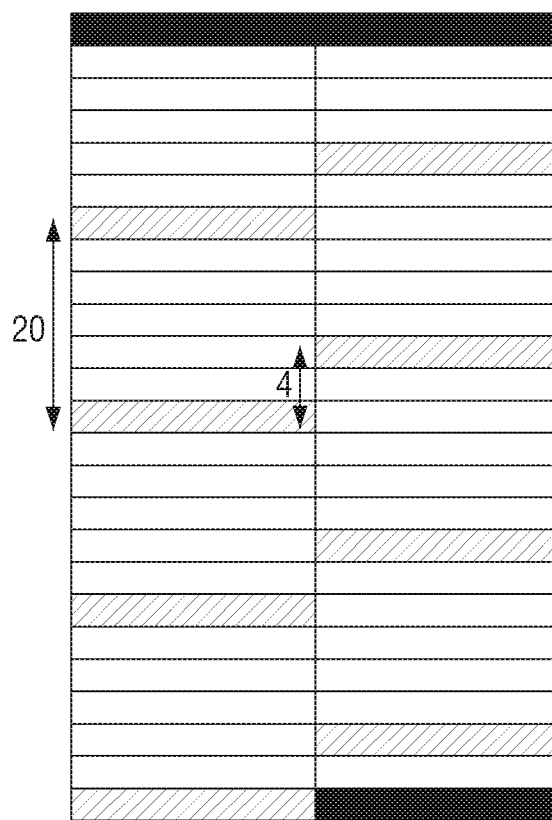
FIG. 7 illustrates an arrangement pattern of scattered pilots which are shifted and arranged by a preset value, according to an exemplary embodiment.

FIG. 7 illustrates an arrangement pattern of scattered pilots which are shifted by a preset value and arranged, according to an exemplary embodiment.

Referring to FIG. 7, when the scattered pilots are positioned at a 20 sub-carrier interval, the scattered pilots circularly shift by a four (4) sub-carrier interval as OFDM symbols increase.

Thus, the pilot and reserved tone inserter 320 may insert the first reserved tone so as not to overlap the scattered pilots inserted in a second column of FIG. 7. Because the scattered pilots inserted in a first column of FIG. 7 are shifted by the four (4) sub-carrier interval based on the scattered pilots inserted in the second column, the pilot and reserved tone inserter 320 may insert the second reserved tone at a position shifted by the four (4) sub-carrier interval from the position of the first reserved tone inserted in the second column.

A following mathematical equation 1 may be used to determine a position of a reserved tone in an OFDM symbol by considering the arrangement pattern of the scattered pilots described above.

$$S_1 = \{i_k + D_X^*(1 \mod D_Y) | i_n \in S_0, 0 \le n < N_{RT}, N_P \le 1 < N_P + L_{normal}\} \quad (1),$$

where S0 indicates a position of a reserved tone and $N_{RT}$ indicates a number of reserved tones.

Thus, the pilot and reserved tone inserter 320 may be configured to determine only position of the first reserved tone without a necessity to calculate positions of a reserved tone with respect to all data symbols. The pilot and reserved tone inserter 320 may only determine position of the second reserved tone by considering a shift value of the scattered pilots across columns. Therefore, a calculating amount can be reduced, and a memory size storing impulse signals corresponding to each reserved tone can be reduced, as described above.

Meanwhile, reserved tones inserted in the frame starting symbol 610 and the frame closing symbol 630 may be determined according to Table 1 below, according to an exemplary embodiment.

TABLE 1

| FFT (# of Reserved tones) | Reserved Tone Indices FSS, FCS Symbol |
|---|---|
| 8k (72) | 151, 313, 387, 763, 809, 925, 1097, 1219, 1265, 1406, 1451, 1485, 1867, 1897, 1935, 1941, 2147, 2243, 2265, 2374, 2433, 2490, 2507, 2513, 2550, 2559, 2679, 2698, 3079, 3106, 3225, 3281, 3334, 3626, 3750,3814, 3953, 4038, 4158, 4179, 4205, 4238, 4298, 4357, 4591, 4669, 4691, 4726, 4982, 4999, 5058, 5169,5206, 5211, 5222, 5310, 5411, |

TABLE 1-continued

| FFT (# of Reserved tones) | Reserved Tone Indices FSS, FCS Symbol |
|---|---|
| 16k (144) | 5423, 5521, 5693, 5813, 5866, 5877, 5883, 5950, 6035, 6043, 6150, 6249, 6446, 6467, 6489 202, 395, 539, 771, 799, 845, 921, 1003, 1103, 1413, 1462, 1505, 1647, 1701, 1734, 1823, 1861, 1873, 1894, 2165, 2369, 2374, 2613, 2675, 2698, 2877, 3178, 3201, 3217, 3390, 3434, 3454, 3737, 3958, 3986, 4033, 4107, 4579, 4721, 4729, 4766, 4783, 4795, 4833, 5025, 5267, 5354, 5522, 5543, 5739, 5789, 5874, 5989, 6187, 6254, 6314, 6567, 6575, 6749, 6775, 6783, 6938, 7009, 7121, 7125, 7215, 7353, 7514, 7522, 7574, 7594, 7902, 7955, 8190, 8230, 8318, 8338, 8527, 8554, 8715, 8757, 8781, 8913, 8994, 9195, 9298, 9306, 9534, 9549, 9586, 9697, 9709, 9761, 9905, 10001, 10047, 10382, 10474, 10535, 10587, 10671, 10707, 10829, 11051, 11073, 11079, 11143, 11257, 11395, 11405, 11467, 11571, 11594, 11931, 11961, 11993, 12022, 12135, 12245, 12430, 12443, 12507, 12526, 12631, 12690, 12813, 12819, 12843, 12918, 12953, 13029, 13059, 13067, 13071, 13157, 13378, 13402, 13441, 13466, 13554, 13590, 13662, 13705, 13747 |
| 32k (288) | 145, 156, 395, 467, 492, 519, 537, 598, 604, 633, 650, 706, 753, 1075, 1171, 1365, 1369, 1499, 1590, 1606, 1957, 2074, 2249, 2357, 2359, 2417, 2471, 2493, 2547, 2675, 2734, 2828, 2932, 2981, 3017, 3110, 3122, 3356, 3607, 3707, 3754, 3758, 3895, 3978, 4329, 4346, 4509, 4556, 5218, 5220, 5247, 5329, 5475, 5500, 5577, 5631, 5909, 5954, 5998, 6007, 6010, 6020, 6166, 6167, 6196, 6206, 6243, 6279, 6485, 6666, 6669, 6827, 7563, 7565, 7833, 7901, 8050, 8074, 8349, 8380, 8467, 8711, 8732, 8779, 8869, 8963, 8997, 9114, 9166, 9491, 9524, 9571, 9578, 9597, 9598, 9643, 9657, 9659, 9751, 9827, 10259, 10295, 10305, 10439, 10606, 10627, 10663, 10748, 10891, 11249, 11279, 11386, 11419, 11437, 11538, 11665, 12069, 12082, 12134, 12218, 12266, 12291, 12329, 12474, 12617, 12654, 12878, 13547, 13566, 13567, 13574, 13641, 13771, 13798, 13935, 14092, 14167, 14292, 14346, 14351, 14474, 14524, 14673, 14690, 14774, 14787, 14810, 14815, 14841, 14935, 14965, 15118, 15353, 15428, 15455, 15558, 15697, 15710, 15723, 15843, 15886, 15891, 15925, 16044, 16105, 16234, 16261, 16534, 16621, 16634, 17044, 17059, 17206, 17317, 17379, 17489, 17689, 18083, 18270, 18374, 18539, 18588, 18683, 18701, 18734, 18739, 18826, 18827, 18993, 19039, 19245, 19265, 19269, 19287, 19301, 19494, 19673, 19885, 19909, 20108, 20212, 20359, 20371, 20372, 20426, 20439, 20516, 20692, 20727, 20729, 20847, 20886, 20919, 20961, 20967, 20982, 21276, 21439, 21727, 21781, 21910, 22396, 22407, 22463, 22529, 22562, 22581, 22687, 22870, 22938, 23147, 23263, 23460, 23566, 23637, 23747, 23978, 24058, 24116, 24201, 24258, 24372, 24379, 24423, 24492, 24583, 24826, 24908, 25137, 25281, 25285, 25343, 25366, 25518, 25770, 25780, 25787, 25814, 26010, 26046, 26100, 26169, 26233, 26257, 26307, 26322, 26361, 26452, 26469, 26490, 26501, 26580, 26629, 26662, 26681, 26756, 26858, 26990, 27006, 27061, 27189, 27252, 27308, 27421, 27433, 27539, 27625, 27694 |

Table 1 shows indices which mark positions of reserved tones inserted in the frame starting symbol and the frame closing symbol, according to an exemplary embodiment. The positions of the reserved tones in Table 1 are positions of the reserved tones in the frame starting symbol 610 and the frame closing symbol 630 which are determined by considering the positions of the scattered pilots and the continual pilots according to modes, i.e., modes of FFT sizes which are 8K, 16K and 32K.

Meanwhile, DVB-T2 considers various FFT sizes of OFDM, which are 1K, 2K, 4K, 8K, 16K and 32K modes, described below. Table 2 below shows a number of sub-carriers, a number of data symbols and a number of reserved tones at each mode of the FFT size, according to an exemplary embodiment.

TABLE 2

|  | 1K mode | 2K mode | 4K mode | 8K mode | 16K mode | 32K mode |
|---|---|---|---|---|---|---|
| Number of Sub-carriers | 1024 | 2048 | 4096 | 8192 | 16384 | 32766 |
| Number of Data Symbols | 853 | 1705 | 3409 | 6517 | 13833 | 27265 |
| Number of Reserved Tones | 9 | 18 | 36 | 72 | 144 | 288 |

In Table 2, the number of reserved tones that can be inserted and inserting positions may be different according to the FFT size mode. The scattered pilots may be inserted in various modified formats according to the above modes, which may be similar to the arrangement pattern of FIG. 7. However, differently from FIG. 7, the scattered pilots may be inserted at a 12 sub-carrier interval. Further, reserved tones may be inserted so as not to overlap the inserting positions of the scattered pilots. Therefore, a number of reserved tones that can be inserted in each mode and inserting positions become different.

Like reserved tones differently inserted according to each of the above modes, reserved tones inserted into the frame starting symbol and the frame closing symbol may be differently inserted according to each mode, according to an exemplary embodiment.

Table 3 below summarizes a number of sub-carriers and a number of reserved tones inserted according to each mode of Table 1.

TABLE 3

|  | 8K mode | 16K mode | 32K mode |
|---|---|---|---|
| Number of Sub-carriers | 8192 | 16384 | 32766 |
| Number of Reserved Tones | 72 | 144 | 288 |

In reference to Table 1, indices marked in modes indicate positions of the reserved tones inserted into the frame starting symbol 610 and the frame closing symbol 630.

Table 1 further shows that that the positions of the reserved tones are different according to the modes.

Meanwhile, reserved tones inserted in the data symbol may be determined according to Table 4 below, according to an exemplary embodiment.

TABLE 4

| FFT (# of Reserved tones) | Reserved Tone Indices Data Symbol |
|---|---|
| 8k (72) | 67, 100, 152, 203, 247, 267, 579, 696, 826, 915, 1017, 1023, 1097, 1245, 1289, 1436, 1452, 1476, 1564, 1575, 1614, 1733, 1773, 1916, 2212, 2333, 2372, 2466, 2565, 2679, 2722, 2779, 2791, 2911, 2935, 2964, 3205, 3246, 3367, 3466, 3544, 3710, 3740, 3751, 3828, 3835, 4002, 4175, 4212, 4645, 4649, 4662, 4933, 5027, 5274, 5496, 5588, 5597, 5690, 5719, 5737, 5897, 6053, 6180, 6277, 6372, 6388, 6447, 6529, 6606, 6735, 6758 |
| 16k (144) | 130, 237, 310, 358, 395, 635, 838, 1074, 1098, 1103, 1143, 1178, 1182, 1257, 1265, 1314, 1450, 1471, 1702, 1724, 1826, 1950, 1953, 1997, 2111, 2115, 2180, 2278, 2572, 2577, 2667, 2811, 2889, 2916, 2926, 3175, 3245, 3387, 3453, 3526, 3541, 3700, 3735, 3787, 4018, 4053, 4126, 4317, 4421, 4479, 4485, 4553, 4675, 4690, 4949, 4990, 5151, 5288, 5289, 5334, 5626, 5752, 5800, 5868, 6015, 6023, 6075, 6127, 6316, 6392, 6566, 6664, 6712, 6750, 6772, 6796, 6916, 7159, 7275, 7405, 7460, 7661, 7676, 7846, 7944, 8026, 8175, 8254, 8328, 8350, 8478, 8648, 8754, 8772, 8852, 9110, 9282, 9397, 9403, 9414, 9449, 9481, 9570, 9596, 9606, 9863, 9974, 9982, 10031, 10206, 10275, 10285, 10340, 10403, 10604, 10778, 10974, 11058, 11094, 11097, 11754, 11810, 11889, 12008, 12011, 12152, 12199, 12343, 12407, 12418, 12993, 13094, 13110, 13114, 13137, 13164, 13338, 13415, 13480, 13575, 13652, 13687, 13716, 13729 |
| 32k (288) | 56, 126, 142, 154, 238, 243, 278, 387, 429, 481, 507, 555, 575, 689, 699, 918, 940, 1052, 1082, 1263, 1507, 1548, 1585, 1601, 1608, 1628, 1741, 1771, 1791, 2140, 2223, 2334, 2513, 2630, 2657, 2669, 2722, 2869, 2963, 3092, 3183, 3363, 3370, 3457, 3473, 3604, 3830, 3959, 4079, 4501, 4642, 4662, 4665, 4709, 5178, 5215, 5298, 5507, 5643, 5708, 5738, 5747, 5755, 5788, 5867, 5932, 5961, 6070, 6153, 6171, 6182, 6296, 6340, 6366, 6413, 6428, 6494, 6639, 6955, 7026, 7027, 7292, 7406, 7612, 8234, 8243, 8252, 8257, 8287, 8525, 8588, 8846, 8921, 9012, 9209, 9276, 9371, 9683, 9864, 9913, 9971, 10007, 10008, 10011, 10314, 10411, 10442, 10452, 10538, 10563, 10743, 10748, 10814, 10925, 11282, 11332, 11448, 11630, 11711, 11714, 11866, 11898, 12022, 12027, 12165, 12196, 12269, 12371, 12697, 12938, 12994, 13044, 13116, 13153, 13175, 13186, 13314, 13398, 13515, 13640, 13660, 13698, 13774, 13916, 14153, 14357, 14362, 14697, 14717, 14938, 15038, 15070, 15101, 15121, 15143, 15157, 15283, 15284, 15302, 15586, 15677, 15681, 15742, 15991, 16067, 16200, 16254, 16290, 16419, 16615, 16621, 16825, 16868, 17091, 17098, 17115, 17350, 17403, 17478, 17484, 17542, 17640, 17677, 17870, 17969, 18006, 18289, 18491, 18663, 18675, 18703, 18741, 18788, 18841, 18990, 19193, 19310, 19422, 19522, 19532, 19537, 19675, 19702, 19832, 19976, 20150, 20186, 20318, 20472, 20613, 20616, 20621, 20622, 20634, 20737, 20886, 20921, 20999, 21089, 21317, 21527, 21751, 21874, 21959, 22052, 22121, 22191, 22331, 22458, 22538, 22548, 22692, 22767, 22793, 22837, 22888, 22905, 22916, 23004, 23059, 23423, 23476, 23505, 23507, 23528, 23567, 23626, 23773, 24065, 24183, 24332, 24920, 24953, 25249, 25298, 25484, 25514, 25547, 25604, 25638, 25701, 25785, 25812, 25895, 26015, 26203, 26226, 26267, 26293, 26327, 26364, 26444, 26467, 26602, 26657, 26697, 26941, 26984, 27069, 27140, 27160, 27208, 27224, 27236, 27492, 27505, 27671, 27677 |

Table 4 shows indices which mark positions of reserved tones inserted in the data symbol 620, according to an exemplary embodiment. The positions of the reserved tones illustrated in Table 4 are determined by considering inserting positions of the scattered pilots and the continual pilots according to modes of FFT sizes which are 8K, 16K and 32K.

Like reserved tones differently inserted according to the above modes, reserved tones inserted in the data symbol may be differently inserted according to the modes, according to an exemplary embodiment.

Table 5 below summarizes a number of sub-carriers and a number of reserved tones inserted according to the modes of FIG. 4.

TABLE 5

|  | 8K mode | 16K mode | 32K mode |
| --- | --- | --- | --- |
| Number of Sub-carriers | 8192 | 16384 | 32766 |
| Number of Reserved Tones | 72 | 144 | 288 |

In reference to Table 4, indices marked in the modes indicate positions of the reserved tones inserted in the data symbol 620. Likewise, positions of the reserved tones marked in the modes are different from one another.

Meanwhile, pilots may be inserted at positions as shown in Table 6 below, according to an exemplary embodiment.

TABLE 6

| FFT (# of Reserved tones) | Continual pilot Indices |
| --- | --- |
| 8k (90) | 9, 25, 41, 154, 173, 301, 357, 477, 505, 609, 645, 761, 805, 909, 941, 1067, 1098, 1199, 1225, 1347, 1397, 1487, 1514, 1633, 1669, 1797, 1822, 1925, 1961, 2089, 2119, 2226, 2245, 2387, 2423, 2546, 2587, 2667, 2709, 2835, 2861, 2993, 3026, 3146, 3189, 3290, 3318, 3473, 3510, 3651, 3683, 3811, 3861, 3991, 4045, 4137, 4163, 4265, 4297, 4417, 4457, 4569, 4598, 4733, 4769, 4901, 4942, 5073, 5113, 5253, 5289, 5389, 5413, 5539, 5585, 5714, 5755, 5847, 5873, 6010, 6045, 6175, 6207, 6342, 6379, 6482, 6525, 6649, 6675, 6862 |
| 16k (180) | 18, 31, 50, 66, 82, 243, 307, 331, 346, 517, 602, 671, 714, 861, 953, 987, 1010, 1157, 1217, 1263, 1290, 1429, 1522, 1563, 1610, 1753, 1818, 1851, 1881, 2061, 2133, 2167, 2197, 2301, 2399, 2430, 2450, 2647, 2694, 2763, 2794, 2899, 2973, 3003, 3027, 3159, 3267, 3302, 3338, 3497, 3593, 3617, 3645, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5671, 5701, 5723, 5895, 5987, 6025, 6051, 6222, 6291, 6331, 6378, 6497, 6579, 6609, 6637, 6818, 6946, 6983, 7021, 7201, 7303, 7343, 7366, 7525, 7621, 7683, 7721, 7895, 7983, 8046, 8090, 8199, 8274, 8307, 8325, 8449, 8531, 8569, 8593, 8743, 8835, 8885, 8915, 9055, 9137, 9171, 9197, 9367, 9466, 9498, 9539, 9723, 9801, 9843, 9885, 10058, 10147, 10190, 10226, 10391, 10506, 10545, 10578, 10703, 10779, 10802, 10825, 10959, 11077, 11133, 11169, 11326, 11429, 11479, 11510, 11629, 11694, 11721, 11747, 11941, 12021, 12063, 12089, 12243, 12350, 12383, 12414, 12598, 12685, 12715, 12758, 12881, 12963, 13013, 13050, 13195, 13297, 13325, 13349, 13517, 13725, 13821 |

TABLE 6-continued

| FFT (# of Reserved tones) | Continual pilot Indices |
| --- | --- |
| 32k (360) | 35, 45, 61, 82, 99, 117, 131, 147, 163, 290, 486, 605, 614, 635, 662, 685, 691, 858, 1033, 1187, 1203, 1269, 1341, 1379, 1427, 1582, 1721, 1881, 1906, 1925, 1973, 2006, 2019, 2217, 2314, 2425, 2434, 2478, 2526, 2549, 2579, 2709, 2857, 3009, 3043, 3083, 3125, 3173, 3219, 3399, 3506, 3621, 3635, 3674, 3701, 3749, 3762, 3997, 4122, 4257, 4266, 4298, 4333, 4382, 4393, 4539, 4601, 4786, 4797, 4831, 4859, 4881, 4899, 5095, 5293, 5378, 5387, 5473, 5525, 5553, 5587, 5693, 5797, 5937, 5946, 5989, 6005, 6037, 6054, 6139, 6317, 6501, 6533, 6558, 6603, 6654, 6675, 6807, 6994, 7163, 7186, 7213, 7233, 7277, 7289, 7467, 7586, 7689, 7701, 7753, 7790, 7813, 7845, 8011, 8117, 8337, 8357, 8389, 8425, 8461, 8477, 8665, 8817, 8893, 8902, 8922, 8949, 8973, 8979, 9177, 9293, 9539, 9547, 9590, 9641, 9679, 9693, 9885, 10026, 10151, 10185, 10214, 10283, 10341, 10349, 10471, 10553, 10646, 10666, 10721, 10766, 10797, 10837, 10977, 11153, 11325, 11341, 11378, 11401, 11431, 11445, 11605, 11789, 11939, 11973, 11994, 12049, 12070, 12102, 12253, 12443, 12557, 12582, 12619, 12662, 12717, 12755, 12866, 12993, 13150, 13158, 13205, 13217, 13254, 13273, 13445, 13635, 13846, 13891, 13907, 13965, 14002, 14041, 14225, 14402, 14571, 14605, 14637, 14685, 14714, 14731, 14917, 15050, 15209, 15242, 15282, 15365, 15390, 15442, 15622, 15790, 15953, 15965, 16055, 16091, 16163, 16179, 16239, 16397, 16533, 16547, 16577, 16613, 16630, 16650, 16750, 16897, 17045, 17061, 17089, 17137, 17173, 17186, 17351, 17485, 17637, 17669, 17695, 17770, 17793, 17829, 17939, 18109, 18246, 18274, 18306, 18341, 18365, 18393, 18566, 18733, 18901, 18931, 18969, 18997, 19049, 19077, 19253, 19445, 19589, 19603, 19653, 19686, 19741, 19769, 19989, 20115, 20275, 20293, 20357, 20379, 20437, 20451, 20675, 20781, 20989, 21011, 21050, 21090, 21149, 21155, 21279, 21405, 21537, 21557, 21577, 21603, 21634, 21650, 21789, 21917, 22133, 22154, 22197, 22266, 22323, 22338, 22489, 22651, 22823, 22857, 22914, 22958, 22979, 23019, 23205, 23258, 23361, 23387, 23406, 23441, 23474, 23493, 23685, 23881, 24007, 24041, 24069, 24125, 24149, 24178, 24317, 24486, 24689, 24699, 24739, 24765, 24813, 24827, 25061, 25195, 25331, 25369, 25385, 25430, 25485, 25515, 25649, 25761, 25894, 25926, 25981, 26025, 26089, 26099, 26246, 26390, 26569, 26594, 26621, 26650, 26674, 26698, 26910, 27033, 27241, 27449, 27511, 27642, 27801 |

Table 6 shows indices which mark inserting positions of the continual pilots according to the modes of FFT sizes which are 8K, 16K and 32K, according to an exemplary embodiment.

The indices marking positions of the reserved tones inserted in the frame starting symbol 610, the frame closing symbol 630 and the data symbol 620, as shown in Tables 1 and 4, are determined so as not to overlap with one another by considering the indices marking the positions of the continual pilots as shown in Table 6 and the positions of the scattered pilots, i.e., arrangement patterns.

Figure 8:
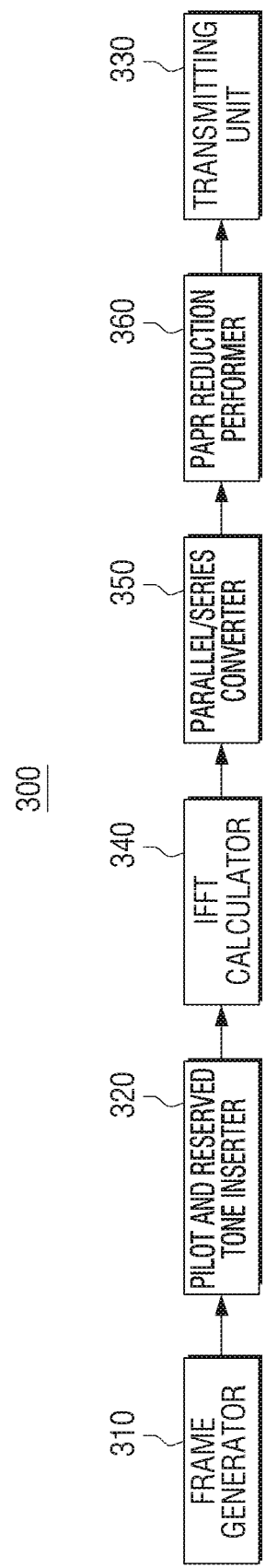
FIG. 8 is a detailed block diagram of a transmitter according to an exemplary embodiment.

FIG. 8 is a detailed block diagram of a transmitter according to an exemplary embodiment.

Referring to FIG. 8, the transmitter 300 may include a frame generator 310, a pilot and reserved tone inserter 320, an inverse FFT (IFFT) calculator 340, a parallel/series converter 350, a PAPR reduction performer 360, and a transmitting unit 330.

If the pilot and reserved tone inserter 320 is more specifically explained, signals at N-L points and signals regarding an L number of reserved tones may be input to the pilot and reserved tone inserter 320. Here, zero (0) is inserted in the L number of reserved tones, instead of data.

The IFFT calculator 340 may perform an inverse Fourier transform to generate a frame starting symbol, a data symbol and a frame closing symbol in which pilots and reserved tones are inserted. Specifically, when a sum of parallel signals at N-L points and an L number of reserved tones are input to the IFFT calculator 340, an IFFT may be performed.

The parallel/series converter 350 may convert parallel signals output from the IFFT calculator 340 into series signals and output the series signals. Specifically, the parallel/series converter 350 may output signals in the time domain by converting parallel signals into series signals.

The PAPR reduction performer 360 may reduce ratios of PAPR based on pilots and reserved tones.

Specifically, the PAPR reduction performer 360 may calculate reducing amounts of PAPR based on pilots and reserved tones, add the calculated reducing amounts of PAPR with the series signals, and output the added results.

The PAPR reduction performer 360 may include a gradient algorithm (not illustrated), add the generated signals by the gradient algorithm (not illustrated) with the outputting signals from the IFFT calculator 340, and output the adding results. Here, the gradient algorithm (not illustrated) may reduce the ratios of PAPR of the output signals from the IFFT calculator 340 by using impulse signals corresponding to reserved tones.

Meanwhile, although not illustrated in FIG. 8, the transmitter 300 may further include a memory (not illustrated) and a controller (not illustrated).

The memory (not illustrated) may store information about a number of reserved tones and positions of the reserved tones according to the FFT sizes of OFDM. The gradient algorithm (not illustrated) generates signals having impulse shapes by using the previously stored information in the memory, and the generated impulse signals are stored in the memory (not illustrated).

Further, the memory (not illustrated) may transmit the information about the number of reserved tones and positions of reserved tones to the controller (not illustrated). The controller (not illustrated) may transmit this information to the pilot and reserved tone inserter 320 so as to allocate reserved tones without collision with data and pilots according to the FFT sizes of OFDM and pilot positions.

Thereby, the pilot and reserved tone inserter 320 may allocate and insert sub-carriers so as not to generate collision between pilots and reserved tones.

Further, the controller (not illustrated) may calculate a shift interval of the scattered pilots according to OFDM symbol indices, and adjust a position shift of reserved tones and phases of impulse signals. Because sizes of impulse signals do not change even if positions of reserved tones circularly shift, a uniform PAPR reducing performance may be maintained. Further, the shift interval may be internally calculated in the pilot and reserved tone inserter 320, not in the controller (not illustrated), and transmitted to the controller (not illustrated) so as to calculate phases.

Figure 9:
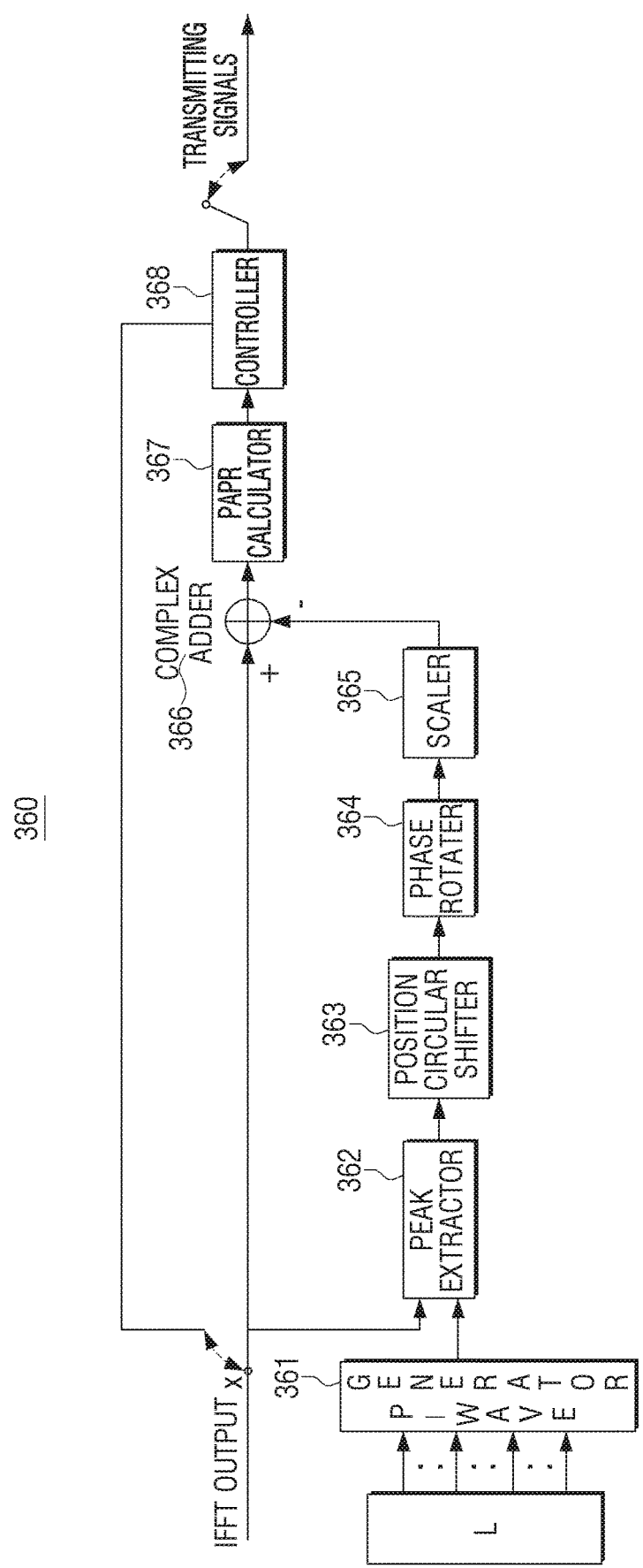
FIG. 9 is a detailed block diagram of a PAPR reduction performer according to an exemplary embodiment.

FIG. 9 is a detailed block diagram of the PAPR reduction performer 360 according to an exemplary embodiment.

Referring to FIG. 9, the PAPR reduction performer 360 may include a P-wave generator 361, a peak extractor 362, a position circular shifter 363, a phase rotator 364, a scaler 365, a complex adder 366, a PAPR calculator 367, and a controller 368.

The P-wave generator 361 may generate P waves having impulse features with an L number of reserved tones while excluding input signals at an N-L point which are parallel signals among an N number of signals. Herein, the P waves are generated by repeatedly performing random-selecting at least one of an L number of reserved tones among whole signals, and selecting the smallest electrical power value among P1-PN-1 values in which peak values of P0 are excluded.

Meanwhile, the peak extractor 362 may extract the maximum peak values of input signals at the N-L point.

Further, the position circular shifter 363 circularly shift positions of the P waves toward positions of the extracted maximum peak values.

The phase rotator 364 matches the circularly shifted P waves with phases of the extracted peak values from the complex plane.

Further, the scaler 365 may scale values of the P waves so that peak values of the output signals obtained from calculating the input signals at the N-L point with IFFT calculation can be less than a preset PAPR value.

In order to reduce the output signals obtained from calculating the input signals at the N-L point with IFFT calculation and maximum peak values of the P waves to be less than a preset level, the complex adder 366 may add the calculated values with the output signals obtained from calculating the input signals at the N-L point with IFFT calculation, and transmit to the PAPR calculator 367 as input values thereat.

The controller 368 may perform a feedback operation so that the input PAPR calculated values can be less than the preset PAPR value. The above process is repeatedly performed until the input PAPR values are less than the preset PAPR value.

Figure 10:
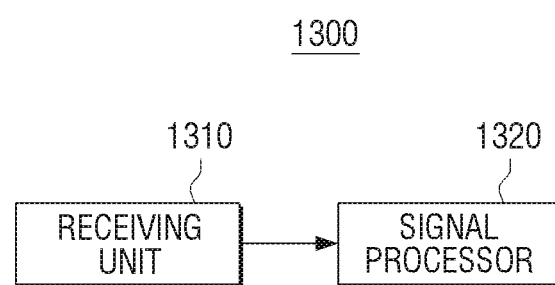
FIG. 10 is a block diagram of a receiver according to an exemplary embodiment.

FIG. 10 is a block diagram of a receiver according to an exemplary embodiment.

Referring to FIG. 10, the receiver 1300 may include a receiving unit 1310 and a signal processor 1320.

The receiving unit 1310 may receive a frame including a frame starting symbol, a data symbol and a frame closing symbol in which pilots and reserved tones are inserted, as described above.

The signal processor 1320 may estimate channels based on the pilots, perform signal-processing of the frame starting symbol, the data symbol and the frame closing symbol by considering positions of the reserved tones, and extract data. Here, the reserved tones are inserted so as not to overlap the positions of pilots.

Figure 11:
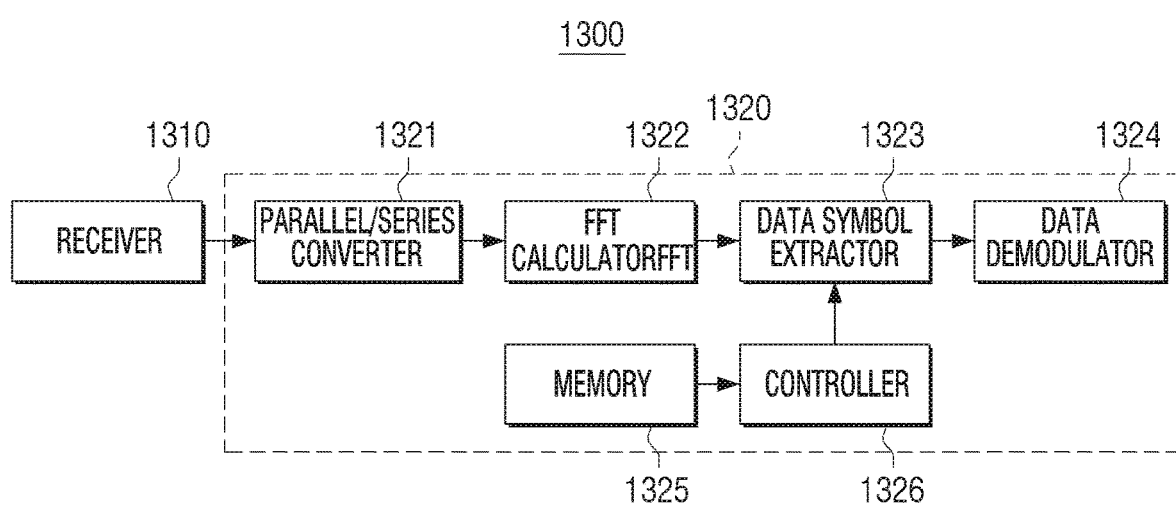
FIG. 11 is a detailed block diagram of a signal processor according to an exemplary embodiment.

FIG. 11 is a detailed block diagram of the signal processor 1320 in the receiver 1300, according to an exemplary embodiment.

Referring to FIG. 11, the signal processor 1320 may include a parallel/series converter 1321, an FFT calculator 1322, a data symbol extractor 1323, a data demodulator 1324, a memory 1325 and a controller 1326.

The parallel/series converter 1321 may convert received signals in the time domain into parallel signals, and output to the FFT calculator 1332.

The FFT calculator 1332 may perform a fast Fourier transform of the input signals, convert them into signals in the frequency domain, and transmit the converted signals to the data symbol extractor 1323.

Here, the memory 1325 may output predetermined positions of the reserved tones inserted in the frame starting symbol, the data symbol and the frame closing symbol, according to an exemplary embodiment, and the output positions of the reserved tones are inputted to the controller 1326.

The controller 1326 adjusts the positions of the reserved tones inserted according to the pilot positions of the received OFDM symbols in the receiver 1310 so as not to collide with the pilot positions, and outputs to the data symbol extractor 1323.

The data symbol extractor 1323 may extract and output signals at the positions except the positions of the reserved tones input from the controller 1326 among the input signals in the frequency domain from the FFT calculator 1322, i.e., signals corresponding to the data symbol. Accordingly, the data symbol extracted by the data symbol extractor 1323 is input to the data demodulator 1324, and data demodulating calculation is performed.

Meanwhile, the reserved tones inserted in the frame starting symbol and the frame closing symbol may be inserted at the positions shown in Table 1.

Further, the reserved tones inserted in the data symbol may be inserted at the positions shown in Table 4.

Further, the pilots may be inserted at the positions shown in Table 6.

Figure 12:
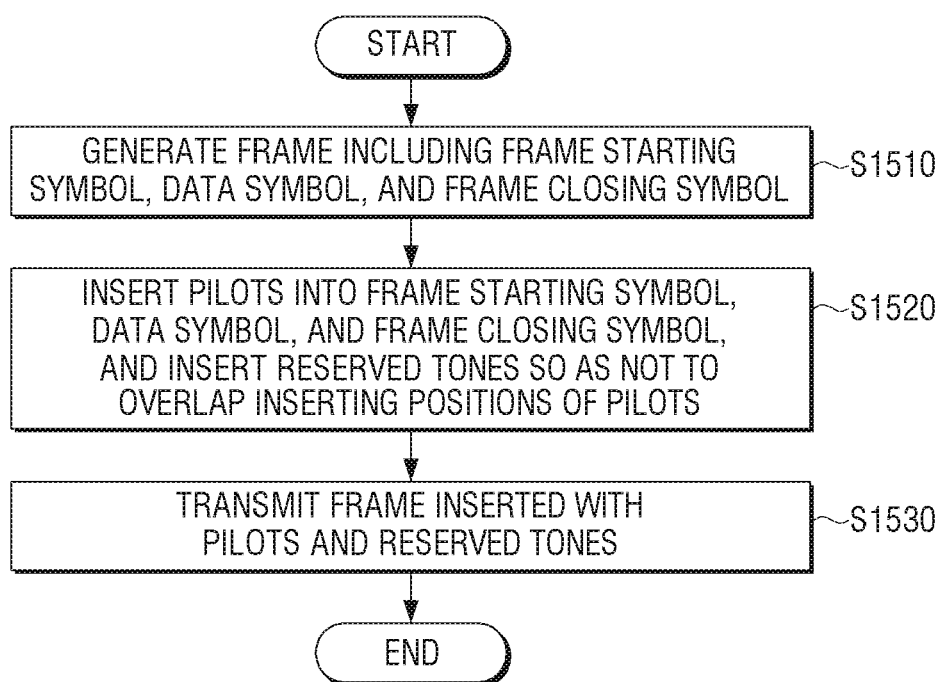
FIG. 12 is a flowchart provided to explain a controlling method of a transmitter, according to an exemplary embodiment.

FIG. 12 is a flowchart illustrating a controlling method of a transmitter, according to an exemplary embodiment.

According to the controlling method of the transmitter illustrated in FIG. 12, a frame including a frame starting symbol, a data symbol, and a frame closing symbol as described above may be generated (S1510).

Next, pilots may be inserted in the frame starting symbol, the data symbol and the frame closing symbol, and reserved tones may be inserted therein so as not to overlap positions of the pilots (S1520).

Here, the pilots may be inserted in the data symbol according to a predetermined first arrangement pattern. And, the reserved tones may be inserted so as not to overlap the positions of the pilots. Pilots may also be inserted in the frame starting symbol and the frame closing symbol according to a predetermined second arrangement pattern, and reserved tones may be inserted so as not to overlap the positions of the pilots. The predetermined second arrangement pattern may be determined based on the predetermined first arrangement pattern.

Further, in the data symbol, a first reserved tone may be inserted based on the arrangement pattern of the pilots inserted therein, and a second reserved tone may be inserted at a position shifted by a preset value from the position of the first reserved tone.

Next, a frame in which the pilots and the reserved tones are inserted may be transmitted (S1530).

Here, the reserved tones inserted in the frame starting symbol and the frame closing symbol may be inserted at the positions shown in Table 1.

Further, the reserved tones inserted in the data symbol may be inserted at the positions shown in Table 4.

The pilots may be inserted at the positions shown in Table 6.

Meanwhile, the controlling method of the transmitter illustrated in FIG. 12 may further include performing IFFT calculation of the frame starting symbol, the data symbol and the frame closing symbol in which pilots and reserved tones are inserted and outputting the calculating results, converting the parallel signals outputted by performing IFFT calculation into series signals and outputting the series signals, and reducing a PAPR based on the pilots and the reserved tones.

Here, in reducing the PAPR, reducing amounts of the PAPR may be calculated based on the pilots and the reserved tones, the calculated reducing amounts of the PAPR may be added to the series signals, and the adding results may be output.

Figure 13:
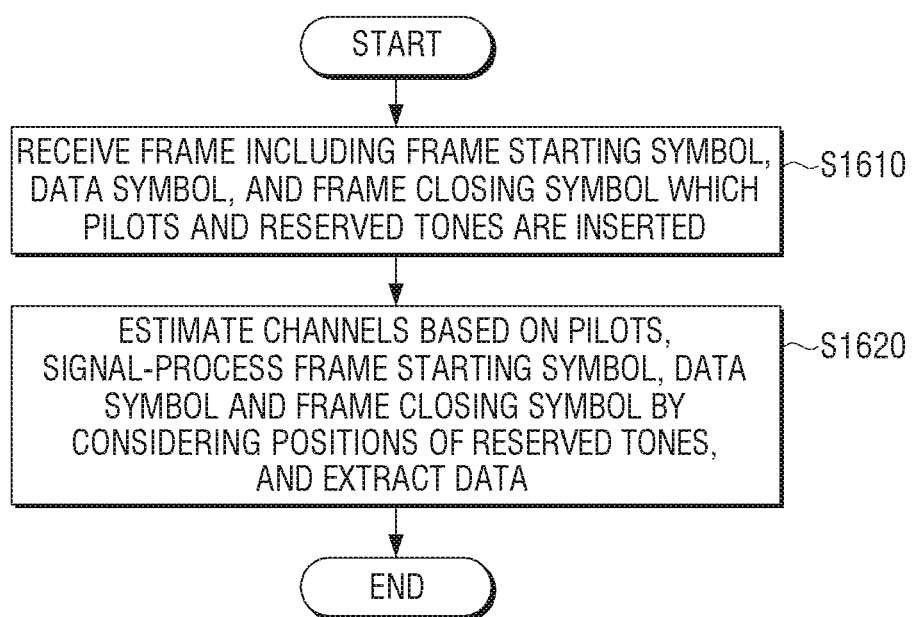
FIG. 13 is a flowchart provided to explain a controlling method of a receiver, according to an exemplary embodiment.

FIG. 13 is a flowchart provided to explain the controlling method of a receiver according to an exemplary embodiment.

The controlling method of the receiver illustrated in FIG. 13 may include an operation of receiving a frame including a frame starting symbol, a data symbol and a frame closing symbol, as described above, in which pilots and reserved tones are inserted (S1610).

The controlling method may also include estimating channels based on the pilots, and extracting data by signal processing the frame starting symbol, the data symbol and the frame closing symbol by considering positions of the reserved tones.

Here, the reserved tones are inserted so as not to overlap the positions of the pilots.

Further, the reserved tones inserted in the frame starting symbol and the frame closing symbol may be inserted at the positions shown in Table 1.

Further, the reserved tones inserted in the data symbol may be inserted at the positions shown in Table 4.

Further, the pilots may be inserted at the positions shown in Table 6.

Meanwhile, a plurality of frames received by the receiver 1300 may be transmitted to a DVB-T2 transmitting system, and signaling areas of the frames may be areas where L1 signaling is transmitted.

According to the above exemplary embodiments, information included in the signaling areas increase by reconstituting the information, and thus, data can be variously processed.

Meanwhile, according to an exemplary embodiment, a non-transitory computer readable recording medium storing programs which consecutively implement the above controlling methods is provided.

For example, there is provided a non-transitory computer readable recording medium storing programs which perform generating a frame including the frame starting symbol, the data symbol and the frame closing symbol, inserting pilots in the frame starting symbol, the data symbol and the frame closing symbol, inserting reserved tones so as not to overlap the positions of the pilots, and transmitting the frame in which the pilots and the reserved tones are inserted.

Further, for example, there is provided a non-transitory computer readable recording medium storing programs which perform receiving a frame including the frame starting symbol, the data symbol and the frame closing symbol in which pilots and reserved tones are inserted, estimating channels based on the pilots, and extracting data by signal processing the frame starting symbol, the data symbol and the frame closing symbol based on the positions of the reserved tones.

The non-transitory computer readable recording medium indicates a medium which store data semi-permanently and can be read by devices, not a medium storing data temporarily such as register, cache, or memory. Specifically, the above programs may be stored and provided in non-transitory computer readable recording medium such as compact disk (CD), digital versatile disk (DVD), hard disk, Blu-ray disk, universal serial bus (USB), memory card, or read-only memory (ROM).

Components, elements or units represented by a block as illustrated in FIGS. 3 and 8-11 may be embodied as the various numbers of hardware, software and/or firmware structures that execute respective functions described above, according to exemplary embodiments. For example, these components, elements or units may use a direct circuit structure, such as a memory, processing, logic, a look-up table, etc. that may execute the respective functions through controls of one or more microprocessors or other control apparatuses. These components, elements or units may be specifically embodied by a module, a program, or a part of code, which contains one or more executable instructions for performing specified logic functions. Also, at least one of the above components, elements or units may further include a processor such as a central processing unit (CPU) that performs the respective functions, a microprocessor, or the like.

Further, although the above block diagrams describing the transmitter and the receiver do not illustrate a bus, communication between the units in the transmitter and the receiver may be performed through the bus. Further, each device may include a processor implementing the above various processes such as CPU and microprocessor.

Further, the foregoing exemplary embodiments and advantages are merely exemplary and are not to be construed as limiting the inventive concept. The present disclosure can be readily applied to other types of apparatuses. Also, the descriptions of the exemplary embodiments of the present inventive concept are intended to be illustrative, and not to limit the scope of the claims. For example, even if, according to the above embodiments, the reserved tones are inserted such that their positions do not overlap positions of the pilots in all of the frame starting symbol, the data symbol and the frame closing symbol, this non-overlapping arrangement may be applied only to one or two of these symbols subject to a system condition.

What is claimed is:

1. A receiving method comprising:
receiving a frame from a transmitting apparatus; and
processing the frame based on positions of tones for a peak to average power ratio (PAPR) reduction,
wherein the frame comprises a preamble, at least one boundary symbol and data symbols;
wherein the preamble comprises L1 signaling for the at least one boundary symbol and the data symbols,
wherein the at least one boundary symbol comprises at least one of a symbol preceding a first data symbol of the data symbols or a symbol following a last data symbol of the data symbols,
wherein the at least one boundary symbol comprises pilots inserted based on a first pattern and the data symbols comprise pilots inserted based on a second pattern,
wherein the first pattern and the second pattern are different from each other, and
wherein the pilots are not inserted at the positions of the tones in the at least one boundary symbol and the data symbols.

2. The receiving method of claim 1, wherein the transmitting apparatus is configured to insert the pilots in the data symbols based on the second pattern, insert the tones in the data symbols such that the positions of the tones do not overlap positions of the pilots in the data symbols, insert the pilots in the at least one boundary symbol based on the first pattern, and insert the tones in the at least one boundary symbol such that the positions of the tones do not overlap the positions of the pilots in the at least one boundary symbol.

3. The receiving method of claim 1, wherein the first pattern is determined based on the second pattern.

* * * * *